United States Patent
Braun et al.

Patent Number: 5,148,361
Date of Patent: Sep. 15, 1992

[54] METHOD AND DEVICE FOR BALANCING THE CIRCUITS OF A THREE-PHASE SYSTEM

[75] Inventors: Rüdiger Braun; Wilhelm Forstbauer, both of Erlangen, Fed. Rep. of Germany

[73] Assignee: Siemens Aktiengesellschaft, Berlin & Munich, Fed. Rep. of Germany

[21] Appl. No.: 742,026

[22] Filed: Aug. 8, 1991

[30] Foreign Application Priority Data

Aug. 16, 1990 [EP] European Pat. Off. ........ 90115700.8

[51] Int. Cl.$^5$ ............................................. H02M 7/48
[52] U.S. Cl. ...................................... 363/95; 363/37; 363/96; 363/98
[58] Field of Search ............... 363/34, 37, 95, 96, 363/98, 132, 137

[56] References Cited

U.S. PATENT DOCUMENTS

| | | | |
|---|---|---|---|
| 4,719,557 | 1/1988 | Forstbauer et al. | 363/79 |
| 4,922,400 | 5/1990 | Cook | 363/132 |
| 4,977,492 | 12/1990 | Kirchberg et al. | 363/37 |
| 4,994,956 | 2/1991 | Kirchberg et al. | 363/98 |
| 5,008,801 | 4/1991 | Glennon | 363/132 |
| 5,055,992 | 10/1991 | Cook | 363/37 |
| 5,057,989 | 10/1991 | Hirose et al. | 363/95 |

FOREIGN PATENT DOCUMENTS 0208088 1/1987 European Pat. Off.
3236071 1/1984 Fed. Rep. of Germany.

OTHER PUBLICATIONS

Siemens Forschungs- und Entwicklungs-Berichte, vol. 6, No. 1, Oct. 1977, pp. 29-38, Berlin, DE; W. Meusel et al.: Coordinate Transformations of Multi-Term Regulation Systems for the Compensation and Symmetrization of Three-Phase Supplies.

Primary Examiner—Steven L. Stephan
Assistant Examiner—Jeffrey L. Sterrett
Attorney, Agent, or Firm—Kenyon & Kenyon

[57] ABSTRACT

A method and a device balance a three-phase system (18) that is produced by means of an invertor (12) from a d.c. voltage source (10), such that the output (R',S',T') of this invertor (12) is equipped with a filter (14) to which a neutral grounding transformer (16) has been added. In keeping with the invention, absolute values ($\hat{u}_R^*$, $\hat{u}_S^*$, $\hat{u}_T^*$), each of which is fed into a regulator device (34, 42; 36, 44; 38, 46) are formed from measured phase-to-phase voltages ($u_{RL}$, $u_{SL}$, $u_{TL}$). Each absolute value produces a phase-to-phase voltage manipulated variable ($U_{StR}$, $U_{StS}$, $U_{StT}$) such that by means of a transformer device (54), these phase-to-phase voltage manipulated variables ($U_{StR}$, $U_{StS}$, $U_{StT}$) are transformed into phase-to-neutral manipulated variables ($U_{Str}$, $U_{Sts}$, $U_{Stt}$) and are fed into angularly symmetrical control units (96, 98, 100). In this way, using a simple mono-phase control of absolute values, a three-phase system (18) with an asymmetrical load can remain symmetrical and, while retaining the symmetry of angle, the absolute values of the invertor (12) are controlled in an asymmetrical fashion.

3 Claims, 3 Drawing Sheets

METHOD AND DEVICE FOR BALANCING THE CIRCUITS OF A THREE-PHASE SYSTEM

BACKGROUND OF THE INVENTION

The present invention relates generally to methods and devices for balancing the circuits of a three-phase system, and more particularly to such a method and a device wherein the three-phase system is produced by means of an invertor from a d.c. voltage source such that the output terminals of this invertor are equipped with a filter with a neutral grounding transformer.

A device for the production of a symmetrical three-phase initial power system with a mid-point conductor is known from European patent 0 208 088. This device contains an array of invertors and a voltage transformer. The transformer is a potential-free three-phase transformer with secondary neutral point circuitry that is attached to the invertor arrangement. In addition, a filter is wired in series with the transformer device. An ideal level indicator prescribes three symmetrical angles as setpoints. A regulating device, to which a set of controls is attached, is assigned to each setpoint value and each output terminal. A pulse-width modulated, triple-phasic bridge voltage changer is intended to serve as an invertor arrangement. A decoupling network that depicts the structure of the transformer device forms, from transient values that correspond to a voltage system at the input terminals of the voltage transformation device. The regulatory arrangement and the decoupling network are wired together in such a way that they provide control voltage for the pairs of branches that each work on one output terminal of the invertor from the setpoint readings and measurements for the phase-to-neutral voltages of the initial current system such that by means of the control voltage, the deviation of the transformed measurements from the setpoint measurements can be regulated. By means of this device, fleeting asymmetries that occur at the clamps of the initial voltage system can be adjusted quickly because each pair of the invertor arrangement is powered by a set of controls in the nature of an asymmetrical power system with a controlling voltage that is quickly changed. The decoupling network makes it possible to convert those measurable variables that are secondarily connected to the load-bearing star point into substitute measurable variables of a zero-conductor free system. As a result, substitute actual values stand ready at the input of the current transformer device for regulation. The control currents that are formed are asymmetrical.

The present invention is directed to the problem of developing a method and a device for producing symmetry in a three-phase system, without resorting to a conversion of secondary measurable variables connected to a star point capable of bearing a load.

SUMMARY OF THE INVENTION

The present invention solves this problem by forming rotational vectors ($\underline{u}_R$, $\underline{u}_S$, $\underline{u}_T$) from measured phase-to-phase voltages ($u_{RL}$, $u_{SL}$, $u_{TL}$) of the three-phase system, and then calculating absolute values ($\hat{u}_R$, $\hat{u}_S$, $\hat{u}_T$) from the rotational vectors ($\underline{u}_R$, $\underline{u}_S$, $\underline{u}_T$), setting these absolute values ($\hat{u}_R$, $\hat{u}_S$, $\hat{u}_T$, to setpoint values of the absolute values ($\hat{u}^*_R$, $\hat{u}^*_S$, $\hat{u}^*_T$). Then the method of the present invention transforms a first, second and third phase-to-phase voltage manipulated variable ($U_{StR}$, $U_{StS}$, $U_{StT}$) to a first, second and third phase-to-neutral voltage manipulated variable ($U_{Str}$, $U_{Sts}$, $U_{Stt}$) respectively, according to Equation (1):

$$U_{Str} = \frac{1}{\sqrt{3}} U_{StR} + \frac{1}{\sqrt{3}} U_{StS} - \frac{1}{\sqrt{3}} U_{StT} \quad \text{EQUATION (1)}$$

$$\text{or } U_{Sts} = \frac{1}{\sqrt{3}} U_{StS} + \frac{1}{\sqrt{3}} U_{StT} - \frac{1}{\sqrt{3}} U_{StR}$$

$$\text{or } U_{Stt} = \frac{1}{\sqrt{3}} U_{StT} + \frac{1}{\sqrt{3}} U_{StR} - \frac{1}{\sqrt{3}} U_{StS}$$

And finally, it feeds the first, second, and third phase-to-neutral manipulated variables ($U_{Str}$, $U_{Sts}$, $U_{Stt}$) to angularly symmetrical control units.

The measured phase-to-phase voltages (interlinked voltages) are, in each instance, transformed into a rotational vector, the absolute values of which are then determined. Every actual absolute value is compared with its associated setpoint value. The deviations that occur are eliminated in each case by a control device. These formed phase-to-phase voltage manipulated outputs form the absolute values of a voltage system, and they are, in each case, transformed into phase-to-neutral manipulated variables, which are fed into the invertor. With this single-phase regulation of absolute value, an three-phase system, even in the case of single-phase load, can remain symmetrical, because by retaining symmetry of angle for the fictitious phase-to-neutral manipulated variables, the absolute values of the invertor are so controlled as to be asymmetrical.

A device for performing the method of the invention comprises a set of regulator devices receiving the setpoints of the absolute values ($\hat{u}^*_R$, $\hat{u}^*_S$, $\hat{u}^*_T$), and being dedicated to the three-phase input terminals (R, S, T). The regulator devices include an absolute value regulator with an input, and a comparator with a minus input. The device includes measuring transformers determining the phase-to-phase voltages ($u_{RL}$, $u_{SL}$, $u_{TL}$) of the three-phase system, and being coupled to the three-phase input terminals (R, S, T). It also includes absolute value devices receiving the phase-to-phase voltages ($u_{RL}$, $u_{SL}$, $u_{TL}$) and outputting absolute values ($\hat{u}_R$, $\hat{u}_S$, $\hat{u}_T$). These absolute value devices include smoothing filters coupled to the minus input of the comparators, vector identifiers coupled to the measuring transformers, and attached vector analyzers coupled to the smoothing filters and the vector identifiers. The device also includes a transformer device coupled to the absolute value regulators, and angularly symmetrical control units coupled to the outputs of the transformer device.

By means of the absolute value devices, the absolute values are determined from the measured phase-to-phase voltages of the three-phase system, absolute values that are fed into every regulator device as actual values. The phase-to-phase voltage manipulated output that is produced is, with the aid of a transforming device, converted into a phase-to-neutral manipulated output that in each case controls the invertor. The embodiment of the elements of the absolute value device—a vector identifier and a vector analyzer—are known from the essay "Coordination transformations for multi-amplitude regulating systems for compensating and balancing three-phase networks," printed in Siemens Forsch- und Entwicklungs-Berichte [Siemens Research and Development Reports], vol. 6 (1977) No. 1, pages 29 to 38.

DETAILED DESCRIPTION

Figure 1:
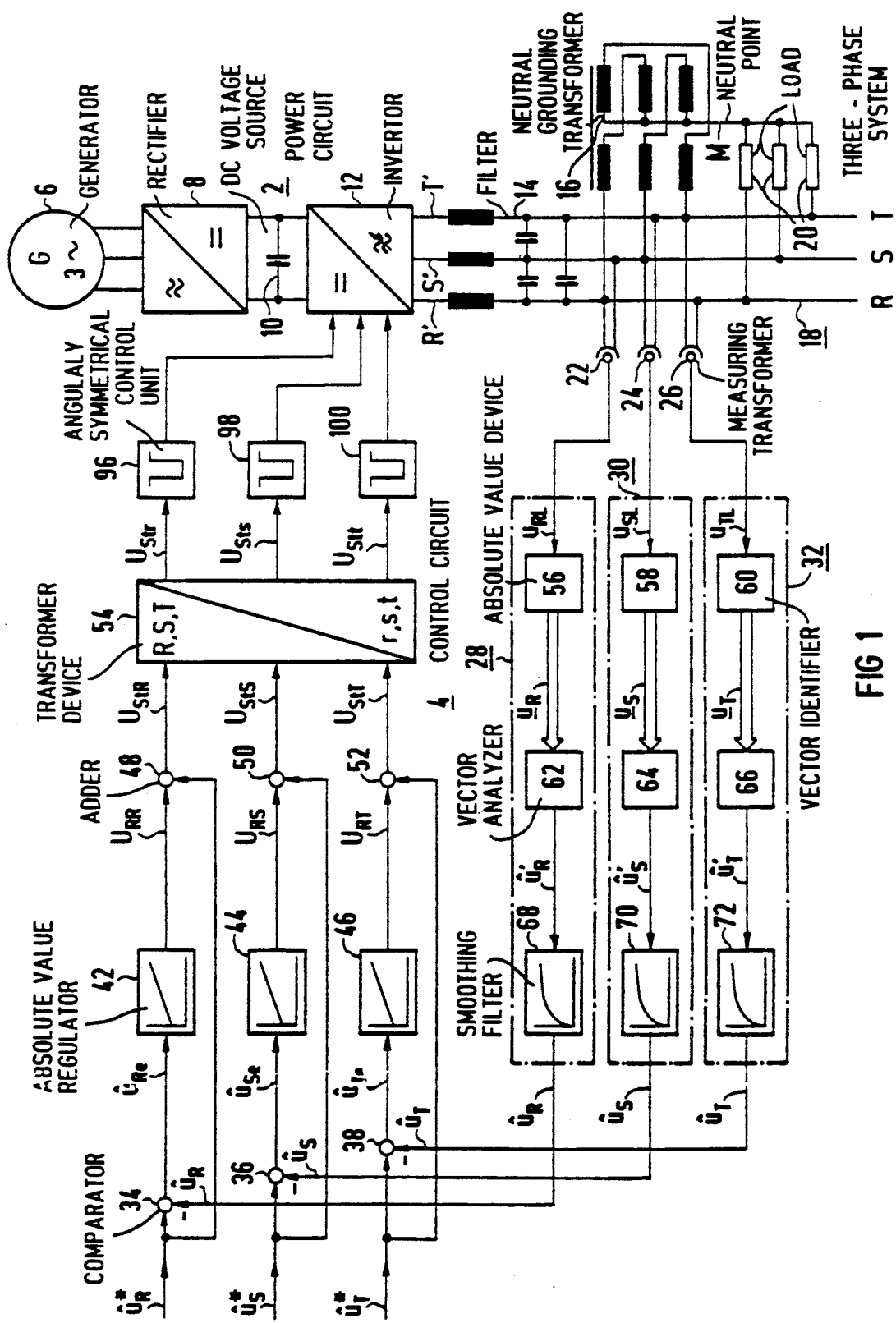
FIG. 1 shows an embodiment of the present invention including its controlling circuit and power circuit.

FIG. 1 shows a device for the production of a three-phase system with input terminals R, S, and T, consisting of an power circuit 2, and a controlling circuit 4.

Power circuit 2 consists of a generator 6, such as a rectifier-energized synchronous generator, to which a rectifier 8, with an added dc voltage source 10, e.g. an intermediate circuit, has been wired. Provision may be made for an invertor or a two-way invertor to serve as the rectifier 8. Invertor 12 is connected to dc voltage source 10, at the input of the invertor 12. The output of the invertor 12 is connected to a filter 14. A neutral grounding transformer 16 is wired to filter 14 and forms neutral point M. As a result, single-phase loading is possible. A load 20 is attached between the individual output terminals R, S, and T of the three-phase system 18 that is formed and the neutral point M. Generator 6, for example, can be operated by a piston mechanism, as a result of which the three-phase system that is produced is an aircraft on-board network of, for example, 3×115 V, 400 Hz. The generator 6 can be driven by wind power, and dc voltage source voltage 10 may be a fuel cell, so that the three-phase system 18 represents an isolated network. Instead of the generator 6, provision may also be made for a supply network, so that the three-phase system that is produced (power supply free of interruption) is a secure three-phase system.

The controlling circuit 4 contains, at its input, three measuring transformers, 22, 24, and 26, by means of which the three outputs from filter 14 may be construed, respectively, as phase-to-phase voltages $u_{RL}$, $u_{SL}$, and $u_{TL}$. These measured phase-to-phase voltages $u_{RL}$, $u_{SL}$, and $u_{TL}$ are, respectively fed to an absolute value device, 28, 30, and 32, at whose output terminals the absolute value $\hat{u}_R$, $\hat{u}_S$, and $\hat{u}_T$ of the phase-to-phase voltages $u_{RL}$, $u_{SL}$, and $u_{TL}$ appear. The absolute value $\hat{u}_R$, or $\hat{u}_S$, or $\hat{u}_T$ is fed, as an actual value to a minus input of a comparator 34, or 36, or 38. At the plus input of this comparator 34, or 36, or 38, a setpoint of the absolute value or $\hat{u}^*_R$ or $\hat{u}^*_S$ or $\hat{u}^*_T$ appears. The regulatory differential, $\hat{u}_{Re}$, or $\hat{u}_{Se}$, or $\hat{u}_{Te}$, which is dependent upon the actual absolute value $\hat{u}_R$, or $\hat{u}_S$, or $\hat{u}_T$, and upon the setpoint of the absolute value $\hat{u}^*_R$ or $\hat{u}^*_S$ or $\hat{u}^*_T$ is conducted to an absolute value regulator, 42, or 44, or 46, to which an adder 48 or 50 or 52 is wired. The value $U_{RR}$, or $U_{RS}$, or $UR_T$, which is produced by absolute value regulator 42, or 44, or 46 is fed to the one input of the adder 48, or 50, or 52, at whose second input the setpoint of the absolute value $\hat{u}^*_R$, or $\hat{u}^*_S$, or $\hat{u}^*_T$ appears. As a result of this stepping up of the setpoint of the absolute value, $\hat{u}^*_R$, or $\hat{u}^*_S$, or $\hat{u}^*_T$ to the value produced by absolute value regulator 42, or 44, or 46, $U_{RR}$ or $U_{RS}$ or $U_{RT}$—a so-called pre-control—a phase-to-phase voltage manipulated variable, $U_{StR}$, or $U_{StS}$, or $U_{StT}$ is obtained. As a result of precontrolling, the regulation is faster, due to the fact that only small differences between the actual and the setpoint have to be smoothed out. For this adjustment of the mean, a PI controller can be used as absolute value regulator 42, or 44, or 46, which reduces the setpoint-actual difference to nil.

Since the absolute value regulators 42, 44, and 46 control triangular variables, but the invertor 12, can set only star amplitudes, the phase-to-phase voltage manipulated variables $U_{StR}$, $U_{StS}$, and $U_{StT}$ must be converted into phase-to-neutral manipulated variables $U_{Str}$, $U_{Sts}$, and $U_{Stt}$. This is done by means of a transformer device 54, which is connected at its input with the output of the adders 48, 50, and 52, and on the output in each case by means of a set of angularly symmetrical controls, 96, 98, and 100, with a pair of branches from the invertor. The angularly symmetrical control units, 96, 98, and 100, are controlled by angle of symmetry (120°). By virtue of the symmetry of angles, which is firmly prescribed, modulation methods for the control units, which produce a third harmonic oscillation, and thus give rise to better utilization of the invertor (supersine-triangular-modulation) can be used to good advantage. A phasic representation can be seen in FIG. 1 of the European patent 0 208 088.

Figure 4:
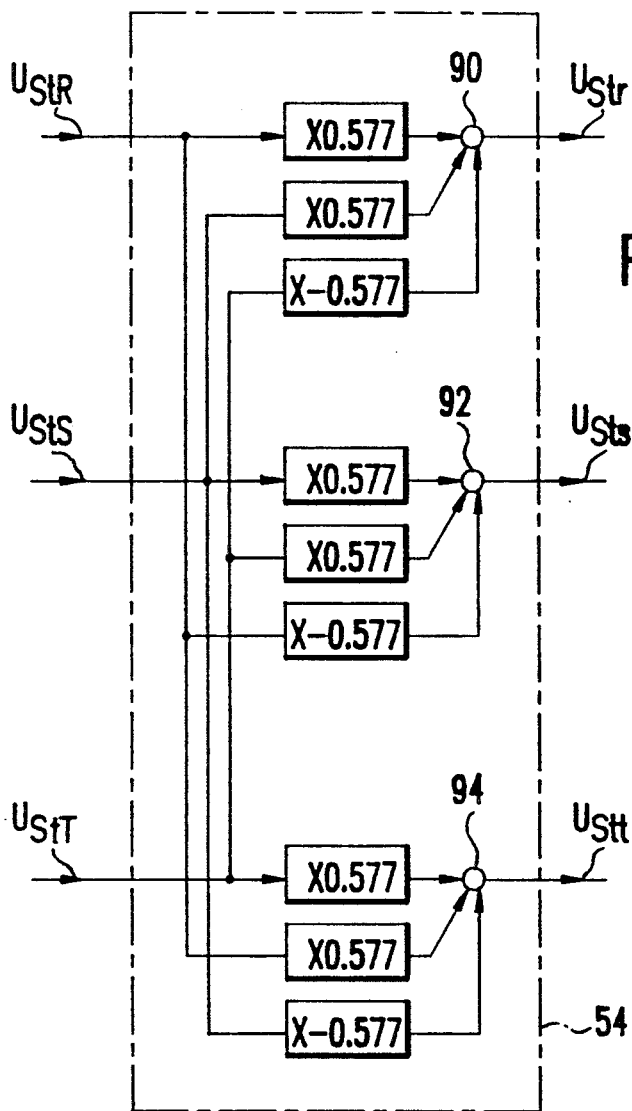
FIG. 4 shows an embodiment of a transformer device of the controlling circuit of FIG. 1.

An embodiment of transformation device 54 is presented in greater detail in FIG. 4. The phase-to-neutral manipulated variable $U_{Str}$ or $U_{Sts}$ or $U_{Stt}$ is produced from the three phase-to-phase voltage manipulated variables $U_{StR}$, $U_{StS}$, and $U_{StT}$ in accordance with the Equation rewritten below as Equation (2) (1).

$$U_{Str} = \frac{1}{\sqrt{3}} U_{StR} + \frac{1}{\sqrt{3}} U_{StS} - \frac{1}{\sqrt{3}} U_{StT} \quad \text{EQUATION (2)}$$

$$\text{or } U_{Sts} = \frac{1}{\sqrt{3}} U_{StS} + \frac{1}{\sqrt{3}} U_{StT} - \frac{1}{\sqrt{3}} U_{StR}$$

$$\text{or } U_{Stt} = \frac{1}{\sqrt{3}} U_{StT} + \frac{1}{\sqrt{3}} U_{StR} - \frac{1}{\sqrt{3}} U_{StS}$$

These transformed phase-to-neutral manipulated variables $U_{Str}$, $U_{Sts}$, and $U_{Stt}$ create an angle-symmetric voltage system, R', S', and T' with unequal absolute values, as a result of which a symmetrical voltage system, R, S, and T is established at the output of filter 14 in conjunction with a skewed load (monophasic load). A phaser of these voltage systems R', S', T' and R, S, T are shown in greater detail in FIG. 5 (no balancing) and FIG. 6 (balancing).

The absolute value devices 28 or 30 or 32 of controlling portion 4 of FIG. 1 exhibits, at its input, a vector identifier 56 or 58 or 60 with an added on vector analyzer 62, or 64, or 66, and on the output, a smoothing filter 68, 70 or 72 for the actual values. It is the task of the vector identifier 56 or 58 or 60 to determine a rotational vector, $$u(t) = u_0^{j(\omega t + \psi)} \quad \text{EQUATION (3)}$$

$$u(t) = u(\cos(\omega t + \psi) + j\sin(\omega t + \psi))$$

from a given oscillation, represented for example, by means of $$u(t) = u\cos(\omega t + \psi) \quad \text{EQUATION (4)}$$

$$u(t) = \tfrac{1}{2}(ue^{j(\omega t+\psi)} + ue^{-j(\omega t+\psi)})$$

Stated in another way, it is the task of the vector identifier 56, or 58, or 60 to determine the appropriate sine oscillation to the given cosine oscillation. An example of an embodiment is illustrated in greater detail in FIG. 2. This determined rotational vector $\underline{u}_R$ or $\underline{u}_S$, or $\underline{u}_T$ is fed to the vector analyzer 62 or 64 or 66. An example of the embodiment of the vector analyzer 62, or 64, or 66, is more closely illustrated in FIG. 3. This vector analyzer 62, or 64, or 66, determines the absolute value of the rotational vector $\underline{u}_R$, or $\underline{u}_S$, or $\underline{u}_T$ according to Equation (5).

$$u = |\underline{u}| = \sqrt{(Re\underline{u})^2 + (Im\underline{u})^2} \quad \text{EQUATION (5)}$$

This determined absolute value $\hat{u}'_R$, or $\hat{u}'_S$ or $\hat{u}'_T$ is still smoothed by means of the smoothing filter 68, or 70 or 72, due to the fact that the phase-to-phase voltages $u_{RL}$ or $u_{SL}$ or $u_{TL}$ at the output of the filter 14 are plagued by harmonic oscillation. At the output of the absolute value device 28 or 30 or 32 an absolute value $\hat{u}_R$, or $\hat{u}_S$ or $\hat{u}_T$ stands available, which is fed into the comparator 34, or 36, or 38.

Figure 2:
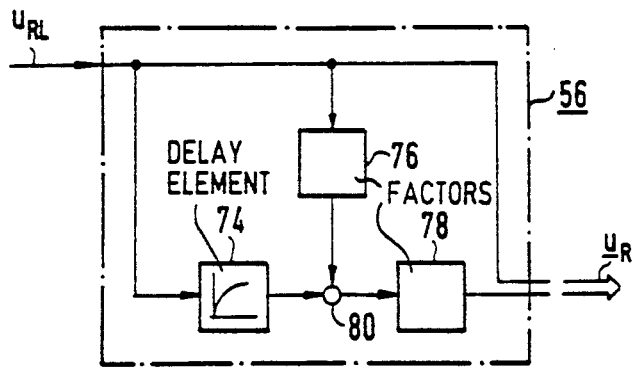
FIG. 2 presents an embodiment of a vector identifier of an absolute value device of the controlling circuit of FIG. 1.

In FIG. 2 an example of an embodiment of the vector identifier 56, 58, and 60 is presented in greater detail. For the sake of saving space, only vector identifier 56 is presented as a representative vector identifier. This vector identifier, 56, which should determine an appropriate sine oscillation to a cosine oscillation, can, in the simplest instance, consist of an operating time element. Out of deference to the short controlling times and the simplicity of execution, vector identifier 56 consists of a delaying member 74, two factors 76 and 78, and an adder 80. The input to vector identifier 56 is on the one hand, directly connected to the output of vector identifier 56, and, on the other hand, connected with factor 76 on one side. The outputs of the delay component 74 and factor 76 are connected to one another by means of the adder 80, such that the output of the adder 80 is connected by way of factor 78 with the output of vector identifier 56. At the output, rotational vector $\underline{u}_R$ appears. For dimensioning the vector identifier 56, attention is called to the essay "Coordinate transformations for Multiple Variable Control Systems for the Compensation and Balancing of Three-phase Networks," printed in Siemens Forsch- u. Entwicklungsberichte [Siemens Research and Development, vol. 6 (1977), No. 1, pages 29 to 38.

Figure 3:
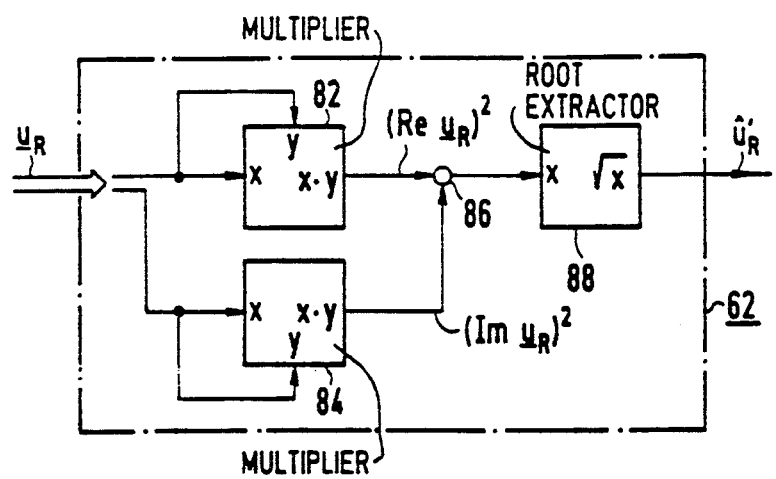
FIG. 3 presents an embodiment of a vector analyzer of the absolute value device of the controlling circuit of FIG. 1.

In FIG. 3, in a manner that is representative of the three vector analyzers, 62, 64, and 66, vector analyzer 62 is presented in greater detail. Vector analyzer 62 consists of two square-law transfer elements, or multipliers 82 and 84, an adder 86, and a root extractor 88. The root extractor may be dispensed with if the desired values are constant. The real portion Re $\underline{u}_R$, and the imaginary portion Im $\underline{u}_R$ of the rotational vector $\underline{u}_R$ are, in each case, fed to the inputs x and y of the multipliers 82 and 84. In each case, the square of the real portion Re $\underline{u}_R$, and of the imaginary portion Im $\underline{u}_R$ appears at their outputs. These squares (Re $\underline{u}_R$)² and (Im $\underline{u}_R$)² are totalled by means of the adder 86, and the total is fed into root-extractor 88. The absolute value $\hat{u}'_R$ of the rotational vector $\underline{u}_R$ appears at the output of the root extractor 88.

Transformer device 54 of FIG. 1 is depicted in greater detail in FIG. 4. As was already mentioned, the phase-to-neutral manipulated variables $U_{Str}$, or $U_{Sts}$, or $U_{Stt}$ are determined from the phase-to-phase voltage manipulated variables $U_{StR}$, $U_{StS}$, and $U_{StT}$ according to Equation (1), reprinted below as Equation (6).

$$U_{Str} = \frac{1}{\sqrt{3}} U_{StR} + \frac{1}{\sqrt{3}} U_{StS} - \frac{1}{\sqrt{3}} U_{StT} \quad \text{EQUATION (6)}$$

$$\text{or } U_{Sts} = \frac{1}{\sqrt{3}} U_{StS} + \frac{1}{\sqrt{3}} U_{StT} - \frac{1}{\sqrt{3}} U_{StR}$$

$$\text{or } U_{Stt} = \frac{1}{\sqrt{3}} U_{StT} + \frac{1}{\sqrt{3}} U_{StR} - \frac{1}{\sqrt{3}} U_{StS}$$

The factor $$\frac{1}{\sqrt{3}}$$

is equal to the factor 0.577. Thus, transformer 54 consists of three adders 90, 92, and 94 at whose inputs the weighted phase-to-phase voltage manipulated variables $U_{StR}$, $U_{StS}$, and $U_{StT}$ appear. The phase-to-neutral voltage manipulated variable $U_{Str}$ or $U_{Sts}$ or $U_{Stt}$ appears at the output of the adder 90 or 92 or 94.

Figure 5:
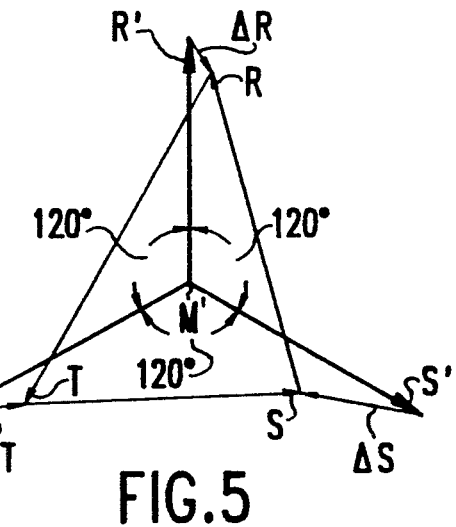
FIG. 5 illustrates a the three-phase voltage system that is produced, having an unbalanced load, without balancing.
Figure 6:
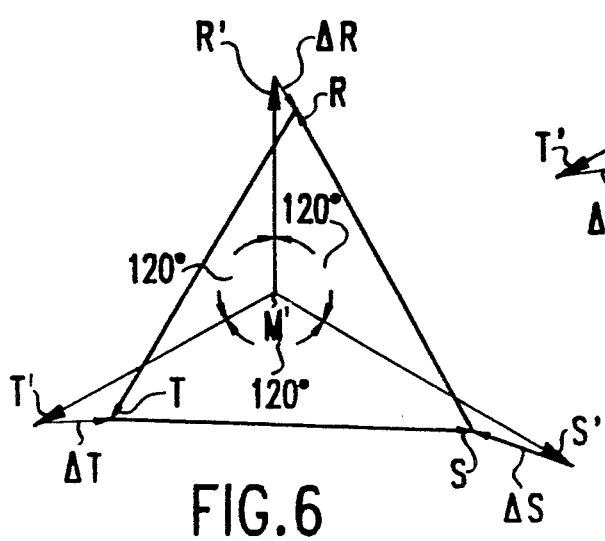
FIG. 6 represents a three-phase voltage system that is produced with skewed load and balancing.

In FIG. 5 the voltage system R', S', and T', which is present at the input of filter 14 and the voltage system R, S, and T which occurs in conjunction with a skewed load or with an asymmetrical load at the output of filter 14 are depicted. In this illustration, the invertor 12 has angularly symmetrical control units for the absolute values. Due to the varied current reductions ΔR, ΔS, ΔT—asymmetrical load, an asymmetrical load appears at the output of filter 14, namely R, S, T. This voltage system can be balanced if the absolute values in the angularly symmetrical system R', S', and T' are adjusted individually and severally in such a way that a symmetrical voltage system, R, S, and T appears at the output of the filter 14, that is, the absolute values of the symmetrical voltage system R, S, and T are equal to the setpoints of the absolute values $\hat{u}^*_R$, $\hat{u}^*_S$, $\hat{u}^*_T$. In the indicator diagram of FIG. 6 it can be seen that the individual absolute values of the angularly symmetrical voltage system R', S', and T' are widely varied from one another and that the voltage system R, S, and T that will appear at the output of filter 14 is symmetrical, even though an asymmetrical load is present.

In this way, it is possible, using a single-phase absolute value adjustment to produce an actual value for every three-phase output of invertor 12 using simple means, as a result of which it will be possible to adjust the absolute values individually and severally so that despite asymmetrical load, the three-phase system 18 remains symmetrical.

What is claimed is:

1. A method for balancing a three-phase system that is produced by an invertor from a d.c. voltage source, which invertor has an output (R', S', T') equipped with a filter with an added on neutral grounding transformer, said method comprising the steps of:

a) forming a plurality of rotational vectors ($\underline{u}_R$, $\underline{u}_S$, $\underline{u}_T$) from a plurality of measured phase-to-phase voltages ($u_{RL}$, $u_{SL}$, $u_{TL}$) of the three-phase system;

b) calculating a plurality of absolute values ($\hat{u}_R$, $\hat{u}_S$, $\hat{u}_T$) from said plurality of rotational vectors ($\underline{u}_R$, $\underline{u}_S$, $\underline{u}_T$);

c) comparing the plurality of absolute values ($\hat{u}_R$, $\hat{u}_S$, $\hat{u}_T$) to a plurality of setpoints of said absolute values ($\hat{u}^*_R$, $\hat{u}^*_S$, $\hat{u}^*_T$) and producing a first, second and third phase-to-phase voltage manipulated variable ($u_{StR}$, $u_{StS}$, $u_{StT}$) from said comparing;

d) transforming the first, second and third phase-to-phase voltage manipulated variable ($U_{StR}$, $U_{StS}$, $U_{StT}$) to a first, second and third phase-to-neutral voltage manipulated variable ($U_{Str}$, $U_{Sts}$, $U_{Stt}$) respectively, according to Equation I:

$$U_{Str} = \frac{1}{\sqrt{3}} U_{StR} + \frac{1}{\sqrt{3}} U_{StS} - \frac{1}{\sqrt{3}} U_{StT} \quad \text{EQUATION I}$$

$$U_{Sts} = \frac{1}{\sqrt{3}} U_{StS} + \frac{1}{\sqrt{3}} U_{StT} - \frac{1}{\sqrt{3}} U_{StR}$$

$$U_{Stt} = \frac{1}{\sqrt{3}} U_{StT} + \frac{1}{\sqrt{3}} U_{StR} - \frac{1}{\sqrt{3}} U_{StS}$$

and e) feeding the first, second, and third phase-to-neutral voltage manipulated variables ($U_{Str}$, $U_{Sts}$, $U_{Stt}$) to a first, second, and third angularly symmetrical control unit, respectively; and f) controlling the inverter by said first, second and third angularly symmetrical control units.

2. A device for balancing a three-phase system that is produced by an invertor from a d.c. voltage source, which invertor has a first, second and third output (R', S', T') equipped with a filter with an added on neutral grounding transformer, said filter outputting a first, second and third three-phase output (R, S, T), said device comprising:

a) a first regulator device receiving a setpoint ($\hat{u}^*_R$) of a first absolute value ($\hat{u}_R$), being dedicated to the first three-phase output (R), and including:
 (i) a first absolute value regulator outputting a first phase-to-phase voltage manipulated variable ($U_{StR}$); and
 (ii) a first comparator receiving the setpoint ($\hat{u}^*_R$) of the first absolute value ($\hat{u}_R$) as a plus input and receiving the first absolute value ($\hat{u}_R$) as a minus input and outputting a first regulatory differential signal ($\hat{u}_{Re}$) to said first absolute value regulator;

b) a second regulator device receiving a setpoint ($\hat{u}^*_S$) of a second absolute value ($\hat{u}_S$), being dedicated to the second three-phase output (S), and including:
 (i) a second absolute value regulator outputting a second phase-to-phase voltage manipulated variable ($U_{StS}$); and
 (ii) a second comparator receiving the setpoint ($\hat{u}^*_S$) of the second absolute value ($\hat{u}_S$) as a plus input and receiving the second absolute value ($\hat{u}_S$) as a minus input and outputting a second regulatory differential signal ($\hat{u}_{Se}$) to said second absolute value regulator;

c) a third regulator device receiving a setpoint ($\hat{u}^*_T$) of a third absolute value ($\hat{u}_T$), being dedicated to the third three-phase output (T), and including:
 (i) a third absolute value regulator outputting a third phase-to-phase voltage manipulated variable ($U_{StT}$); and (ii) a third comparator receiving the setpoint ($\hat{u}^*_T$) of the third absolute value ($\hat{u}_T$) as a plus input and receiving the third absolute value ($\hat{u}_T$) as a minus input and outputting a third regulatory differential signal ($\hat{u}_{Te}$) to said third absolute value regulator;

d) a first measuring transformer determining a first phase-to-phase voltage ($u_{RL}$) of the three-phase system, and being coupled to the first three-phase output (R);

e) a second measuring transformer determining a second phase-to-phase voltage ($u_{SL}$) of the three-phase system, and being coupled to the second three-phase output (S);

f) a third measuring transformer determining a third phase-to-phase voltage ($u_{TL}$) of the three-phase system, and being coupled to the third three-phase output (T);

g) a first absolute value device receiving the first phase-to-phase voltage ($u_{RL}$), outputting a first absolute value ($\hat{u}_R$), and including:
 (i) a first smoothing filter coupled to the minus input of the first comparator;
 (ii) a first vector identifier being coupled to the first measuring transformer;
 (iii) a first attached vector analyzer being coupled to the first smoothing filter and the first vector identifier;

h) a second absolute value device receiving the second phase-to-phase voltage ($u_{SL}$), outputting a second absolute value ($\hat{u}_S$), and including:
 (i) a second smoothing filter coupled to the minus input of the second comparator;
 (ii) a second vector identifier being coupled to the second measuring transformer;
 (iii) a second attached vector analyzer being coupled to the second smoothing filter and the second vector identifier;

i) a third absolute value device receiving the third phase-to-phase voltage ($u_{TL}$), outputting a third absolute value ($\hat{u}_T$), and including:
 (i) a third smoothing filter coupled to the minus input of the third comparator;
 (ii) a third vector identifier being coupled to the third transformer;
 (iii) a third attached vector analyzer being coupled to the third smoothing filter and the third vector identifier;

j) a transformer device being coupled to the first, second and third absolute value regulators, transforming said first, second and third phase-to-phase voltage manipulated variables ($U_{StR}$, $U_{StS}$, $U_{StT}$) into a first second and third phase-to-neutral voltage manipulated variable ($U_{Str}$, $U_{Sts}$, $U_{Stt}$) and having said first second and third phase-to-neutral voltage manipulated variables ($U_{Str}$, $U_{Stt}$) as a first, second and third output, respectively;

k) a first angularly symmetrical control unit being coupled to the first output of the transformer device and being coupled to the inverter;

l) a second angularly symmetrical control unit being coupled to the second output of the transformer device and being coupled to the inverter; and m) a third angularly symmetrical control unit being coupled to the third output of the transformer device and being coupled to the inverter, whereby said first, second and third angularly symmetrical control units control the inverter based on the first second and third phase-to-neutral voltage manipulated variables ($U_{Str}$, $U_{Sts}$, $U_{Stt}$).

3. The device according to claim 2, further comprising:
   a) a first adder having an output coupled to the transformer device and a first input coupled to the first absolute value regulator, and having as a second input the setpoint of the first absolute value ($\hat{u}^*_R$), which has been coupled to the first comparator;
   b) a second adder having an output coupled to the transformer device and a first input coupled to the second absolute value regulator, and having as a second input the setpoint of the second absolute value ($\hat{u}^*_S$), which has been coupled to the second comparator; and
   c) a third adder having an output coupled to the transformer device, and having a first input coupled to the third absolute value regulator, and having as a second input the setpoint of the third absolute value ($\hat{u}^*_T$), which has been coupled to the third comparator.

* * * * *